No. 879,127.
PATENTED FEB. 11, 1908.
A. BELER.
PRESSURE REGULATOR.
APPLICATION FILED OCT. 31, 1907.
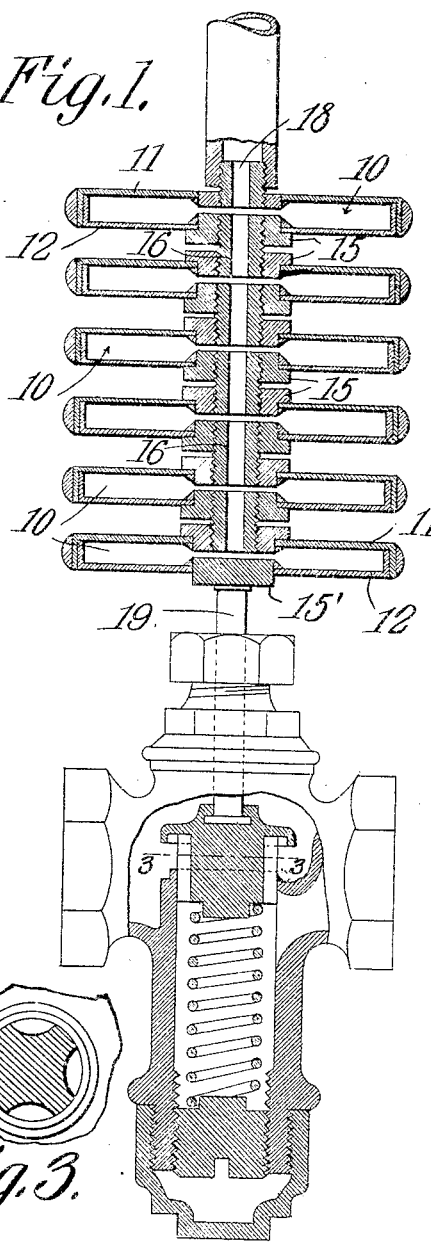
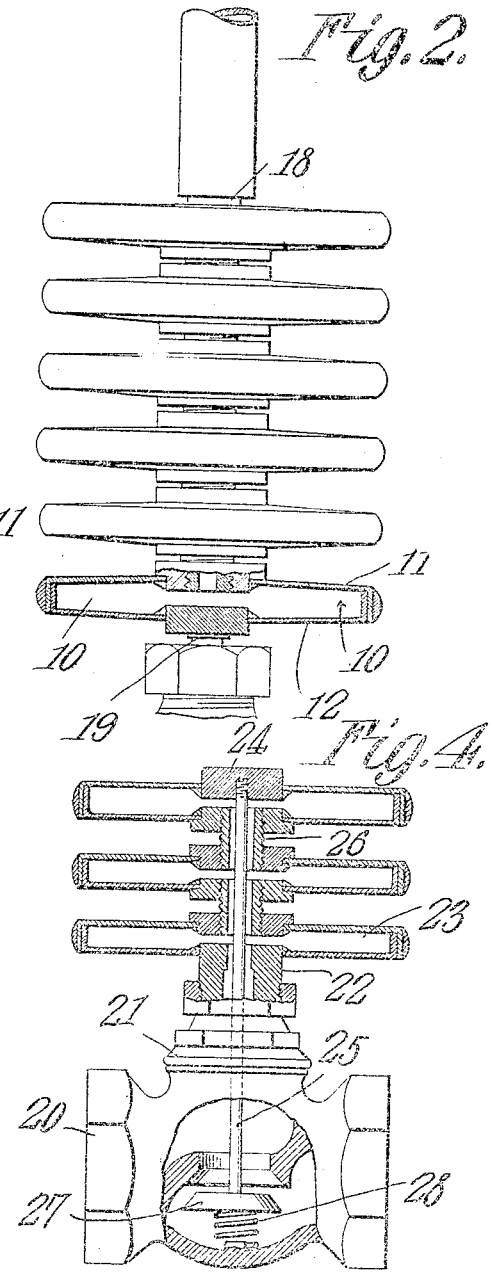
Adolf Beler,
INVENTOR.
WITNESSES:

UNITED STATES PATENT OFFICE.

ADOLF BELER, OF PITTSBURG, PENNSYLVANIA, ASSIGNOR TO BELER WATER HEATER CO., OF PITTSBURG, PENNSYLVANIA.

PRESSURE-REGULATOR.

No. 879,127.

Specification of Letters Patent.

Patented Feb. 11, 1908.

Application filed October 31, 1907. Serial No. 400,013.

*To all whom it may concern:*

Be it known that I, ADOLF BELER, a citizen of the United States, residing at Pittsburg, in the county of Allegheny and State of Pennsylvania, have invented a new and useful Pressure-Regulator, of which the following is a specification.

This invention relates to pressure regulating devices, and has for its principal object to provide a mechanism of novel construction for controlling the flow of gas, steam or cold water or other fluids through a heating system, or the supply of liquid or gaseous fuel to a steam boiler or other device, or any other place where it is advisable to employ the pressure of liquid, vapor or gaseous fluids to control their own flow or the flow of any fluid such as liquid, gas, steam, air, or vapor.

The principal object of the invention is to provide a pressure regulator of very simple construction, and of extreme sensitiveness, and which, while of compact structure, will permit of considerable range of movement for the purpose of opening or closing a valve or similar controlling device.

A further object of the invention is to provide a pressure regulator in which a series of expansible chambers are so connected together that the sum of the expansions in all of the chambers will be transmitted to the member to be controlled.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a sectional elevation of a pressure regulator constructed in accordance with the invention. Fig. 2 is a similar view of the same in expanded condition. Fig. 3 is a section on line 3—3, Fig. 1. Fig. 4 is a view partly in section and partly in elevation of a modified form of pressure regulator.

Similar numerals of reference are employed to indicate corresponding parts throughout the several figures of the drawings.

In carrying out the invention, a series of expansible chambers 10 are employed, these being each formed of a pair of interfitting members 11 and 12 having peripheral flanges, the flange of one fitting within the other, and the flanges being brazed, soldered or otherwise rigidly secured together, to form closed chambers. A band 12ª preferably surrounds the flanged portions of the members 11 and 12 and is brazed or otherwise secured in place, the same tending to reinforce the peripheral portions of said members at their points of attachment. Each of the members 11 and 12 constitutes a diaphragm, and to the central portion of each diaphragm is firmly secured a hub or central collar 15 all of said hubs or collars being internally threaded, and those belonging to the adjacent diaphragm of superposed chambers being connected by small threaded sections 16, while the hubs or collars of the diaphragms belonging to each chamber are maintained in spaced relation.

At one end of the pressure regulator the collar is provided with an extended nipple 18 which may be in the form of one of the pipe sections 16, and this nipple is adapted to connect to the pipe, reservoir, or other container for the fluid to be used in operating the device. At the opposite end of the regulator the end hub or collar 15' is imperforate, and is arranged to engage against or to transmit motion to the device to be controlled, this in the present instance being illustrated in the form of a valve stem 19.

When the fluid under pressure is admitted through the nipple 18 it passes into all of the chambers 11 and the two diaphragms 11 and 12 of each chamber will be forced outward. Inasmuch as the nipple 18 and the end hub member 15 are held rigid, the expansion of the first chamber will transmit movement to the second hub, and from thence to the entire series of chambers, and this movement will be augmented by expansion of the second chamber, and further augmented by the expansion of the third chamber, and so on, until the end member 15' is moved against the valve stem or other device to be controlled, the extent of movement transmitted to the latter being in proportion to the pressure of the operating fluid.

The construction hereinbefore set forth is particularly designed for closing a valve so as to cut off the flow of a fluid other than that utilized for actuating the pressure regulator. If desired, however, the construction may be modified so that the expansion of the regulator will result in cutting off the flow of the fluid operating the regulator. This construction has been shown in Fig. 4 and is particularly designed for use in connection with steam. By referring to Fig. 4 it will be noted that the valve casing 20 has a tubular extension 21 thereon to which a perforated end collar 22 is secured, said collar being employed in lieu of the collar 15' heretofore referred to. A series of closed chambers 23 connected in the manner hereinbefore described is mounted above the collar 22, the upper chamber being provided with an imperforate collar 24 to which a valve stem 25 is secured. This stem extends downward through the threaded pipe sections 26 which connect the chambers 23 and a valve 27 is connected to the lower portion of the stem and normally bears against a spring 28. When the walls of the chambers 23 are in their normal positions the valve 27 is open. Steam or other fluid is therefore free to pass under ordinary pressure and upward into the chambers 23. When, however, the pressure passes a predetermined degree the chambers 23 will be expanded and valve 27 shifted toward its seat so as to partly or entirely cut off the flow of fluid through the casing 20.

The several diaphragms of which the chambers are formed have an inherent tendency to resume positions parallel with each other, so that when the pressure is reduced, the regulator will contract, and when the pressure is increased, the regulator will expand, the degree of expansion being directly proportioned to the degree of pressure of the fluid.

I claim:—

A fluid pressure regulator consisting of a series of superposed diaphragms arranged in pairs, the diaphragms of each pair being connected at their peripheries to form an expansion compartment, each of said diaphragms having a central orifice, a hub secured within and extending through each orifice, the inner or adjoining ends of the hubs constituting outlet slits opening into the compartments, each of said hubs having a threaded bore extending therethrough, and adjustable pipe connections between the hubs and extending into the bore thereof, said connections being disposed in alinement, a supply pipe adjustably connected to and opening through the diaphragm at one end of the series, and a valve fixedly connected to the diaphragm at the outer end of the series.

In testimony that I claim the foregoing as my own, I have hereto affixed my signature in the presence of two witnesses.

ADOLF BELER.

Witnesses:
J. Ross Colhoun,
Jas. M. Walker.